UNITED STATES PATENT OFFICE.

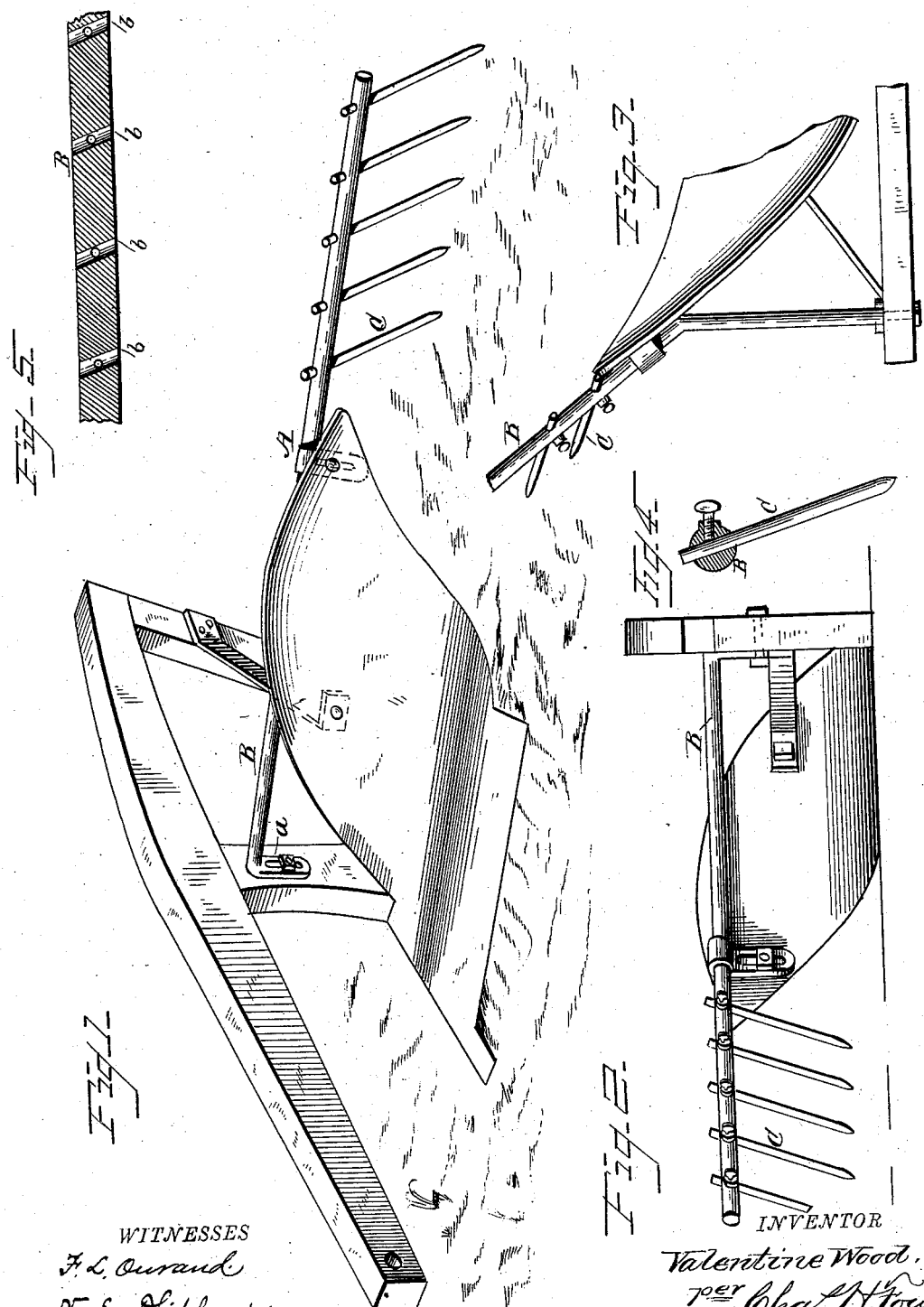

VALENTINE WOOD, OF PERU, INDIANA.

ATTACHMENT FOR PLOWS.

SPECIFICATION forming part of Letters Patent No. 292,272, dated January 22, 1884.

Application filed October 17, 1883. (No model.)

*To all whom it may concern:*

Be it known that I, VALENTINE WOOD, a citizen of the United States, residing at the city of Peru, in the county of Miami and State of Indiana, have invented certain new and useful Improvements in Attachments for Plows; and I do hereby declare that the following is a full, clear, and exact description of the same, reference being had to the annexed drawings, making a part of this specification, and to the letters and figures of reference marked thereon.

Figure 1 of the drawings is a perspective view of a plow, showing my attachment connected thereto; Fig. 2, a rear elevation of the same; Fig. 3, a detail view, showing a modified means of connecting the attachment to the plow; Fig. 4, a detail view, showing the manner of adjustably securing the teeth to the rod; and Fig. 5, a longitudinal vertical section of the outer end of the adjustable rod, showing the inclination of the oblique slots.

The present invention has relation to that class of plows provided with a rake or harrow attachment adjustably connected to the plow, so that it can be raised or lowered with relation thereto as circumstances require.

In attachments of this class as heretofore constructed the teeth have had an outward and rearward inclination; but not independent vertical adjustment, for the reason that they are cast solid with the arm or beam thereof, and necessarily remain at all times in the same relative position. It is also common to provide plows with a hinged and adjustable bar and a series of supplemental plows adjustably connected thereto.

The object of the invention is to improve the construction of the above class of plow attachments, whereby greater lightness with increased practicability is obtained, and also rendered more effective, the attachment being secured both to the mold-board and standard of the plow, and the rod provided with oblique tooth sockets or perforations to receive the teeth, which are adjustably connected to the rod, which in turn is also adjustable upon the mold-board and standard, thus enabling the teeth to receive independent vertical adjustment or the rod and teeth to be elevated together, rendering the attachment more effective, and keeping the furrow clean without throwing the plowed ground back and moving all the ground turned by any one furrow without clogging. These several objects I attain by the construction substantially as shown in the drawings and hereinafter described and claimed.

In the accompanying drawings is represented a plow of the ordinary construction to which my improved attachment is connected and consists of a suitable rod, B, carrying the teeth C.

Preferably secured to the rear portion of the mold-board of the plow is a slotted eye-piece, A, capable of vertical adjustment thereon, and forms a bearing for the rod B at a point about midway of its ends. The inner end of the rod B has a bent slotted extremity, as shown at $a$, by which it is adjustably connected to the standard of the plow or frame thereof; or, if preferred, this end of the rod may be secured to the inner portion or corner of the mold-board, and rendered vertically adjustable by any of the well-known means.

Though I prefer to have the rod B extend in a direct line from the outer upper corner of the plow, as shown in Fig. 1, the inner end of said rod may be bent, so as to be secured to the landside of the plow at right angles thereto, as shown in Fig. 3, the rod being capable of vertical adjustment at its points of fastening.

It is evident that these modifications may be made without departing from the principle of my invention.

The rod B has a series of oblique tooth sockets or perforations, $b$, said rod extending out from the mold-board far enough to cover the turned furrow.

By the peculiar angle of the sockets or perforations $b$, when the teeth C are inserted therein they will assume an inclination in both an outward and backward direction, thus enabling every portion of the ground turned up by the plow to be harrowed or pulverized, the outward inclination of the teeth preventing the tendency of the harrow to drag the plow from the furrow, while the backward inclination prevents clogging by roots, grass, or like substances, and also enables the harrow to pass over obstacles without breaking or checking the plow.

The teeth C have each an independent vertical adjustment, and are held in the position adjusted by set-screws or other convenient means. Thus the rod and teeth may be elevated together, or the teeth receive independent adjustment, as found desirable.

By providing the rod B with the oblique tooth sockets or perforations $b$ any tooth, no matter how straight, when connected to the rod, will assume an outward and backward inclination with relation thereto, this being considered of great importance in simplifying the construction and effectiveness of the attachment, as the rod can be manufactured at a small cost, as can also the teeth, there being no screw-threads and shoulders required on the teeth, they being simply plain rods pointed at the ends.

Having now fully described my invention, what I claim as new, and desire to secure by Letters Patent, is—

In combination with a plow, the harrow attachment constructed substantially as shown and described, and consisting of the rod having oblique tooth sockets or perforations, and bent slotted portion or extremity attached to the plow-standard, the slotted eye-piece, arranged midway upon the rod and adjustably attached to the mold-board, and the harrow-teeth adjustably secured in the oblique sockets or perforations, whereby the rod and the teeth may be elevated together, or the teeth receive independent vertical adjustment, the latter having both an outward and a backward inclination, as and for the purpose specified.

In testimony that I claim the above I have hereunto subscribed my name in the presence of two witnesses.

VALENTINE WOOD.

Witnesses:
NOTT N. ANTRIM,
JAMES M. BROWN.